US 8,539,565 B2

(12) United States Patent
Beletski et al.

(10) Patent No.: US 8,539,565 B2
(45) Date of Patent: Sep. 17, 2013

(54) LOAD BALANCING IN SERVER COMPUTER SYSTEMS

(75) Inventors: Rouslan Beletski, Kenmore, WA (US); David T. Dopson, Seattle, WA (US); Sriram Sampath, Redmond, WA (US); Huei Chung Wang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1303 days.

(21) Appl. No.: 12/053,342

(22) Filed: Mar. 21, 2008

(65) Prior Publication Data
US 2009/0241176 A1 Sep. 24, 2009

(51) Int. Cl.
*H04L 29/06* (2006.01)
(52) U.S. Cl.
USPC ................................. 726/7; 726/5; 709/223
(58) Field of Classification Search
USPC ............... 726/5, 6, 7, 8, 9, 10, 11, 12, 13, 26, 726/27, 28, 29, 30; 709/223, 224, 225, 226
See application file for complete search history.

(56) References Cited

U.S. PATENT DOCUMENTS

| 5,881,238 A * | 3/1999 | Aman et al. ................. 709/226 |
|---|---|---|
| 6,067,580 A | 5/2000 | Aman et al. |
| 6,304,967 B1 | 10/2001 | Braddy |
| 6,362,836 B1 | 3/2002 | Shaw et al. |
| 6,922,724 B1 | 7/2005 | Freeman et al. |
| 6,950,849 B1 | 9/2005 | Brandstatter |
| 7,146,417 B1 | 12/2006 | Coile et al. |
| 2004/0250059 A1 * | 12/2004 | Ramelson et al. ............ 713/150 |
| 2005/0055435 A1 | 3/2005 | Gbadegesin et al. |
| 2007/0143460 A1 * | 6/2007 | Ben-David et al. .......... 709/223 |
| 2007/0150586 A1 * | 6/2007 | Kilian et al. .................. 709/224 |
| 2007/0180113 A1 | 8/2007 | Van Bemmel |
| 2007/0198656 A1 | 8/2007 | Mazzaferri et al. |
| 2007/0226214 A1 | 9/2007 | Smits |
| 2008/0225718 A1 * | 9/2008 | Raja et al. ..................... 370/235 |

OTHER PUBLICATIONS

Kaplan, "Extending Terminal Server with the Citrix Access Platform", at <<http://www.citrix.com/site/resources/dynamic/partnerDocs/ROI_WhitePaper2.pdf>>, Citrix System, Inc., 2005, pp. 28.
Lee, "Windows Server 2008", availabel at least as early as Sep. 28, 2007, at <<http://download.microsoft.com/documents/uk/technet/downloads/technetmagazine/14_18_longhorn_desfin.pdf>>, pp. 14-18.
"Terminal Services Session Broker (TS Session Broker)", at <<http://technet2.microsoft.com/windowsserver2008/en/library/902a6081-9ecd-45ec-96ee-f51097d71c8c1033.mspx?mfr=true>>, Microsoft Corporation, Sep. 24, 2007, pp. 3.

* cited by examiner

*Primary Examiner* — Kambiz Zand
*Assistant Examiner* — Hilary Branske
(74) *Attorney, Agent, or Firm* — Lee & Hayes, PLLC (57) ABSTRACT

Systems and methods to implement load balancing of connections to a server computer in a server collection are described. The server collection receives connection requests from remote clients over a network. A session broker evaluates one or more load parameters of the server computers in the server collection and, based on those load parameters, determines load associated with each server computer. The session broker redirects the connection requests to the server computer which has a lesser load.

18 Claims, 5 Drawing Sheets

LOAD BALANCING IN SERVER COMPUTER SYSTEMS

BACKGROUND

A variety of techniques exists that allow one or more users to access applications hosted on a computing device, such as a server computer. Examples of such techniques include Terminal Services™ (TS) remoting systems from the Microsoft® Corporation. Terminal Services™ systems generally include a server computer hosting one or more applications. In certain cases, applications may be distributed over a number of server computers that form a server collection or a server farm. Users can connect to a single server computer or a server computer in the server farm through a session. A session becomes active when a connected user interacts with the server computer. A plurality of users can interact with the server computer as if they were directly linked with the server computer. Sessions can exist over a local network, such as a local area network (LAN), or can be remoted via the Internet. Sessions may get disconnected due to several reasons like network failure, time delay, etc.

In case a session is disconnected, a user may attempt to reconnect or reestablish the session in order to continue working. Irrespective of load, a user may be directed to a previously disconnected session, if one exists. An exception to this scenario may be if the application the user wants to run is not present in the machine where his earlier session was; however, this is not a factor here. In case the user is directed to an existing session, the connection request can be directed to the pertinent server computer to reestablish the connection, even though the connection request may be made to another server computer within the server farm.

As the number of sessions increases, the load on the server computer increases. Therefore, only a definite number of sessions may exist at the server computer at a given instance. Various techniques exist that allow an individual monitoring a network, such as a system administrator, to balance the load at one or more server computers. These techniques can be implemented with the help of hardware and software.

SUMMARY

This summary is provided to introduce concepts related to load balancing connection requests to a server computer within a server collection. These concepts are further described below in the detailed description. This summary is not intended to identify essential features of the claimed subject matter, nor is it intended for use in determining the scope of the claimed subject matter.

In one implementation, a server broker computer manages server computers in a server collection. A load balancing module in the server broker calculates load of the one or more server computers and redirects connection requests from the server computers in the server collection, to a least loaded server.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

Systems and methods for load balancing connection requests to a server computer within a server farm or server collection (server collection) are described. For example, the systems and methods described implement load balancing of connection requests by directing the connection requests to a least loaded server computer within the server collection or the server farm. The load on a server computer can be evaluated based on a number of parameters. Additional connection requests can be redirected to a pertinent server computer for maintaining an even distribution of session requests among the server computers within the server farm.

To implement load balancing of connection requests in a server collection, a module or an agent determines the least loaded server computer within the server collection. The module may direct new session requests to the least loaded server. The load associated with one or more of the server computers can be understood to be the load on each of the server computer when a client device is connected through a session.

In one implementation, the module can determine the load associated with one or more of the server computers based on an index. The index may serve as an indication of the perceived load that may be associated with a server computer in consideration. In another implementation, the module can manage the number of pending session requests that subsist during the process of logging-in to a server computer. In yet another implementation, the module can implement load balancing by managing the number of active sessions that may exist for a given server computer.

While aspects of described systems and methods for load balancing connection requests in a server collection can be implemented in a number of different computing systems, environments, and/or configurations, embodiments of system analysis and management are described in the context of the following system architectures.

An Exemplary System

Figure 1:
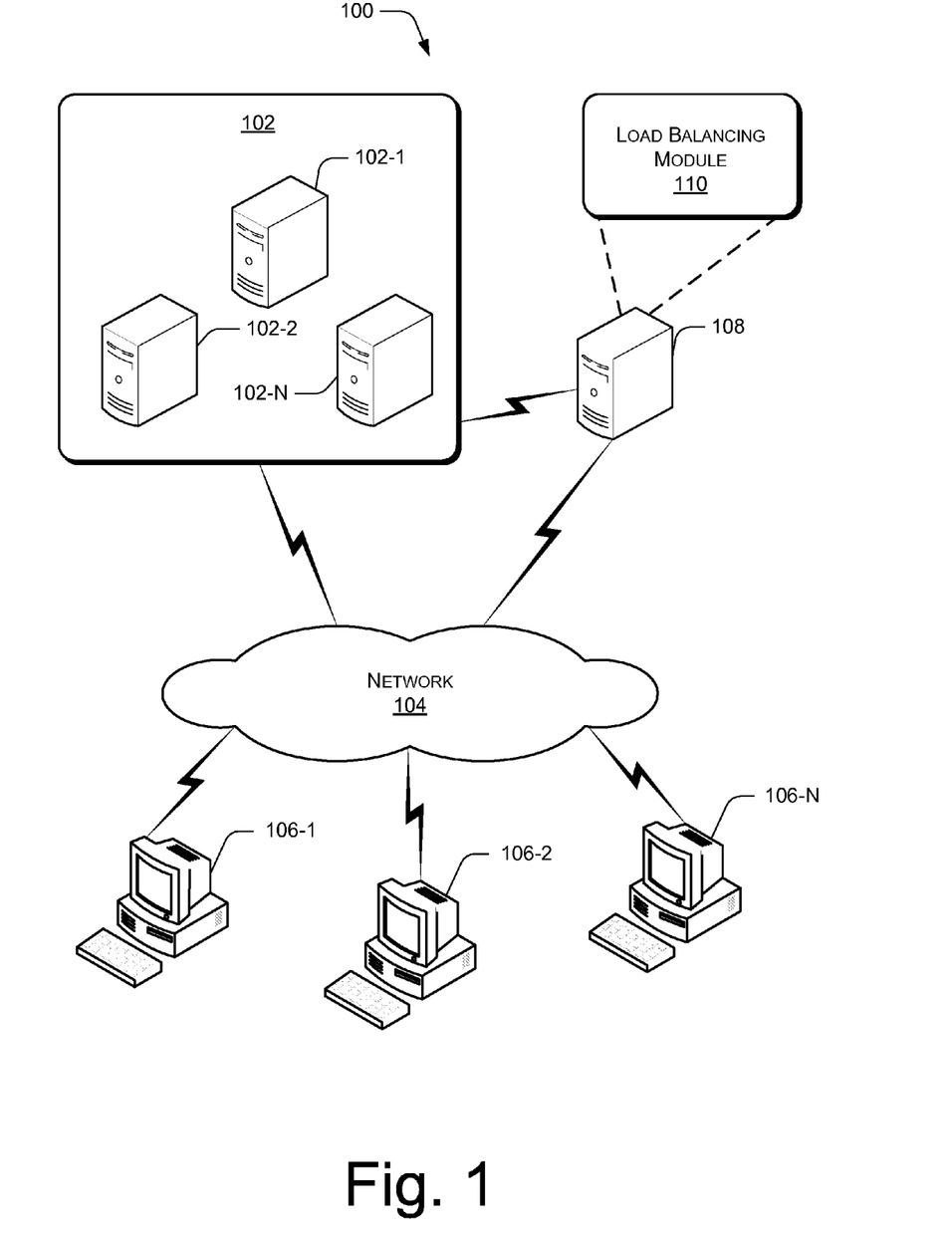
FIG. 1 is a network diagram illustrating an exemplary network for load balancing connection requests to a server computer in a server collection.

FIG. 1 shows an exemplary computing environment 100 for redirecting connection requests to a server computer within a server farm or server collection (hereinafter, referred to as server collection). The computing environment 100 includes a server collection 102. The server collection 102 can include one or more server computers, such as server computers 102-1, 102-2, ..., 102-N, a network 104, and one or more client devices or clients, for example, clients 106-1, 106-2, ..., 106-N (collectively referred to as clients 106).

In one implementation, the computing environment 100 can be a network environment of a company, including thousands of PCs, various server computers, and other computing-based devices spread throughout several countries. Alternately, in another implementation, the computing environment 100 can be a home network environment with a limited number of PCs and servers. The clients 106 can be coupled to each other in various combinations through wired and/or wireless networks, for example, a local area network or LAN, a wide area network or WAN, or any other networking technology known in the art.

The server collection 102, including server computers 102-1, 102-2, . . . , 102-N, and the clients 106 can communicate with each other through the network 104. In one implementation, the environment 100 may be a server collection based on a Terminal Services™ system, in which one or more clients 106 can access applications hosted on server computers (e.g., the server collection 102). The server collection 102 and the clients 106 can communicate with each other based on one or more protocols. For example, Remote Desktop Protocol (RDP) may be used in the context of a remote client access system, such as Terminal Services™ systems. The one or more server computers in the server collection 102 may include a Terminal Services™ Configuration Admin Utility to incorporate any settings or changes in the configuration of a server computer. Changes in server configurations can be made with the help of a user interface (UI) available in the Admin Utility. The types of changes that can be made may include, but are not limited to, enabling a server computer to participate in session broker load balancing, setting server weight parameters, and so on.

The network 104 may be a wireless or a wired network, or a combination thereof. The network 104 may also be a collection of individual networks, interconnected with each other and functioning as a single large network (e.g., the Internet or an intranet). Examples of such individual networks may include, but are not limited to Local Area Networks (LANs), Wide Area Networks (WANs), and Metropolitan Area Networks (MANs). Further, individual networks may be wireless or wired networks, or a combination thereof. Furthermore, the network 104 connecting the server collection 102 and the clients 106 may implement a transport protocol, such as the transmission control protocol over Internet protocol (TCP/IP).

The system 100 may further include a session broker server computer 108, interchangeably referred to as session broker 108, hereinafter. The session broker 108 and the server collection 102 can communicate with each other through interfaces such as Remote Procedure Call (RPC) interface. The session broker 108 includes a load balancing module 110 that calculates the load of one or more server computers in the server collection 102. Based on the load calculated, the session broker 108 redirects a new connection request to a server computer that has a lesser load or handles fewer sessions as compared to other server computers.

In the described system or network 100, users may access applications hosted on one or more of the server computers in the server collection 102. The users, through the clients 106, can interact with the server collection 102 by creating respective sessions. Existence of a number of sessions may create a load on one or more server computers of the server collection 102. In one implementation, a new connection request may be redirected to any of the server computers in the server collection 102 based on the load that each server computer is handling at that instance. If a server computer, for example, the server computer 102-1, is already managing a maximum number of allowed sessions, the session broker 108 can redirect the connection request to another server computer which is the least loaded or is handling a fewer number of sessions.

In another implementation, a new connection request may be directly made to the session broker 108. The load balancing module 110 in the session broker 108 calculates the load of each server computer in the server collection 102. Based on the calculated load, the session broker 108 then redirects the connection request to another server computer which is the least loaded or is handling a fewer number of sessions. The maximum number of allowed sessions that a server computer may handle can be dependent on hardware parameters of the server computer, such as CPU resource, memory resource, and so on.

In one implementation, the load balancing module 110 can evaluate the load of one or more of the server computers in the server collection 102 based on other parameters also. Examples of such parameters include, but are not limited to, the number of pending sessions, server weight associated with a server computer, the number of active sessions, and so on. To evaluate load, an RPC interface passes recently updated values of various parameters, such as the above mentioned parameters, to the session broker 108. The load balancing module 110 then receives the parameter values and determines the least loaded server computer in the server collection 102 based on the parameter values. The session broker 108 can direct the connection requests for new sessions to the least loaded server computer of the server collection 102. As indicated previously, the load associated with one or more of the server computers of the server collection 102 is the load on each of the server computer of the server collection 102, when a client device is connected to the server computer through a session.

In one implementation, the load balancing module 110 can determine the load associated with one or more of the server computers of the server collection 102 based on an index. The index may serve as an indication of the perceived load that may be associated with a particular server computer in the server collection 102. In another implementation, the load balancing module 110 can manage the number of pending sessions that subsist during the process of logging-in to a server computer. In an implementation, the load balancing module 110 can implement load balancing by managing the total number of active sessions existing at an instance for a given server computer of the server collection 102. The manner in which the load balancing module 110 implements load balancing of all the connection requests is further discussed in reference with FIG. 2.

An Exemplary Server Computer

Figure 2:
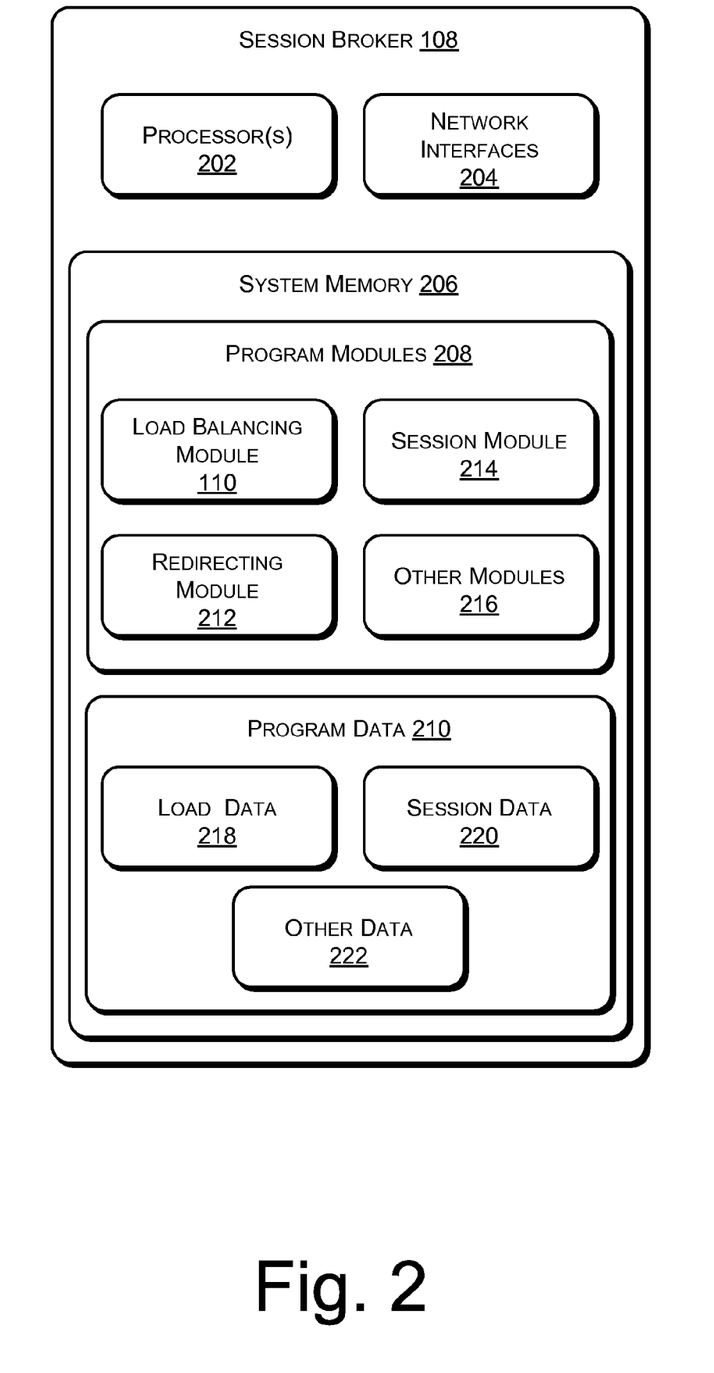
FIG. 2 is a block diagram illustrating an exemplary server computer implementing load balancing connection requests to a server computer in a server collection.

FIG. 2 illustrates an exemplary session broker 108 of the server collection 102. The session broker 108 may be implemented as one of a number of nodes, as in the case of the Internet, an organizational intranet, a local area network, or a separate computer. The session broker 108 may include one or more processor(s) 202, network interfaces 204, and a memory 206. The processor(s) 202 may be implemented as one or more microprocessors, microcomputers, microcontrollers, dual core processors, and so forth. Among other capabilities, the processor(s) 202 may be configured to fetch and execute computer readable instructions stored in the system memory 206.

The network interfaces 204 enable the session broker 108 to communicate with other computing devices, such as the server collection 102 and the clients 106, over the network 104. Furthermore, the network interfaces 204 may include one or more ports for connecting a number of computing devices to each other or to another server computer. The network interfaces 204 facilitate communication within a wide variety of networks and protocol types, including wired networks (e.g., LAN, cable, etc.) and wireless networks (e.g., WLAN, cellular, satellite, etc.).

The memory 206 may include any computer-readable medium known in the art, for example, volatile random access memory (e.g., RAM) and non-volatile read-only memory (e.g., ROM, flash memory, etc.). As illustrated in FIG. 2, the memory 206 may include program modules 208 and program data 210. Program modules, in general, include routines, programs, objects, components, data structures, etc., which perform particular tasks or implement particular abstract data types.

The program modules 208 discussed herein include the load balancing module 110, a redirecting module 212, a session module 214, and other modules 216. The other modules 216 may include programs that supplement applications on a computing-based device, such as an operating system. The program data 210 include load data 218, session data 220, and other data 222.

As discussed above, the server collection 102 can collectively host a plurality of applications that can be accessed by the clients 106. For example, the session broker 108 allows the clients 106 to access the hosted applications by connecting the clients 106 to the server collection 102 over the network 104. The session broker 108 redirects the connection requests made by the clients 106 to one or more server computers in the server collection 102 that are capable of handling these requests. In one implementation, when the session broker 108 directly receives the connection requests from the clients 106, the redirecting module 212 in the session broker 108 redirects the clients 106 to one or more server computers that are least loaded or handling fewer requests. In another implementation, the clients 106 may send the connection requests to the server collection 102. In such a case, the redirecting module 212 directs the clients 106 to the session broker 108, and then to the least loaded server computer.

Following the redirection, the clients 106 can interact with one or more least loaded server computers of the server collection 102 through respective sessions. In general, a session can be termed either active if a client is actively interacting with a server computer in the server collection, or idle when the client gets disconnected from the server computer in the server collection. In case of idle sessions, disconnected clients may not use the resources of the servers, but remain connected to a server computer.

The manner in which a session is created can be based on techniques known in the art. For example, the session module 214 can authenticate the users accessing the server collection 102 based on their credentials. Once the authentication is complete, the users, through one or more of the clients 106, can access applications hosted on the server collection 102. Information associated with a session is created and can be stored in the session data 220. For example, the session data 220 may include information that indicate sessions that may have previously existed associated with a particular user credential.

For implementing load balancing, the load balancing module 110 in the session broker 108 may associate the server computer, such as the server computer 102-1, with an index or a server weight. It is to be appreciated that in cases where different hardware is deployed, a distributed computing environment may not be homogenous. For example, a computing system with more resources, such as memory, CPU resource, and so on, may be capable of handling a larger number of load draining actions, such as managing connection requests. Such systems would consequently have an association with a larger number of sessions due to the hardware capacity of the systems.

As an indication of load bearing capabilities, an index or server weight can be associated with one or more of the server computers in the server collection 102. Therefore, a server computer associated with a larger weight may be capable of handling more connection requests. It is to be appreciated that the index or the server weight is a logical concept. Therefore, in another convention, a smaller weight can be an indication of the server computer's capability of handling a larger number of connection requests.

In an exemplary illustration, assume that the server computers 102-1, 102-2, 102-3 and 102-4 have 10, 10, 10 and 19 sessions and are associated with server weights 1, 1, 1, and 2, respectively. As the number of connections that a server computer can handle proportionally increases with the server weight, a weight of 2 would indicate that the server computer could manage 20 sessions. Therefore, a next connection request would be redirected by the session broker 108 to the server computer 102-4.

In one implementation, the load balancing module 110 manages the connection requests by monitoring the number of pending sessions that may be associated with the server collection 102. Typically, in distributed computing environments, such as systems based on Terminal Services™, a time lag persists between the assignment of a user and completion of the logging-in process (e.g., authentication of the user credentials). In such cases, users who wish to log-on to one or more server computers in the server collection 102 will be continued to be assigned to the respective server computers until the log-in process is complete. This can result in a rapid increase in the number of session requests to a single server computer, such as server computer 102-1. In such cases, the number of connections may exceed the maximum number of allowed connections for the server computer 102-1, resulting in poor system performance.

The load balancing module 110 counts the number of users that wish to access a given server computer, such as the server computer 102-1, through one or more of the clients 106 without waiting for the clients 106 to finish the logging-in process. The load balancing module 110 tracks the number of pending redirections for the server computer 102-1. For example, the session module 214 assigns a user, such as the client 106-1, to the server computer 102-1 and increments the count indicating pending connection requests. As soon as the logging-in process is complete, the load balancing module 110 can start decrementing the count indicating the number of pending request to the server computer 102-1. This will allow another user to initiate a request for a connection to the server computer 102-1.

A request can also be made for a connection if the number of pending requests does not exceed a threshold value, i.e., the maximum number of allowed connections to a server computer. Setting a threshold value for a server computer, for example, one of the server computers 102, can assure that the number of connections to the server computer does not exceed the maximum number of connections allowed to the server computer. The load balancing module 110 can specify a soft cap index on the maximum number of pending requests. For example, in case a server computer is down due to a system error, all users routed to that server would fail to connect. Therefore, the load balancing module 110 can limit the maximum number of users who receive uninterrupted connectivity.

In another implementation, the load balancing module 110 can implement load balancing by managing the number of active and idle sessions that may persist with a server computer within the server collection 102. Typically, a user who is actively connected to a server computer, for example the server computer 102-1, would consume more system resources as compared to another user who is connected but is idle, or has become disconnected as a result of remaining in an idle state for a period of time. The load balancing module 110 tracks the number of active sessions and idle sessions independently from each other. This allows a system administrator to balance the load on the server computer 102-1 based on the number of active and idle sessions separately allowing the load balancing mechanism to be extensible.

In another implementation, the load balancing module 110 can evaluate the load associated with each server computer in the server collection 102 based on the load parameters described above including server weights, active sessions, idle sessions, and so on. For example, the load associated with a server computer can be determined from the following Algorithm or Equation (1):

$$Load = \frac{(Active * K_0 + Disc * K_1 + Pending * K_2)}{ServerWeight} \quad (1)$$

Where Active and $K_0$ indicate the number of active sessions associated with the server computer and their associated weights, respectively; Disc and $K_1$ indicate the number of disconnected session and associated weights, respectively; Pending and $K_2$ indicate the number pending sessions and their associated weights, respectively; and ServerWeight indicates the weight associated with one or more of the server computers, i.e., 102-1, 102-2, . . . , 102-N, within the server collection 102.

Load indicators for calculating the load on one or more of the server computers in the server collection 102 can be defined by third party individuals or organizations. For example, an individual may define a load indicator based on CPU usage history, memory usage, page faults per second, and so on. Such third party load indicators can be utilized in Equation (1) above, for evaluating the load associated with the server computers in the server collection. For example, the load associated with a server computer can be determined by utilizing the third party load indicators in Algorithm or Equation (2):

$$Load = \frac{(Active * K_0 + Disc * K_1 + Pending * K_2 + TSLoad * K_3)}{ServerWeight} \quad (2)$$

Where TSLoad and $K_3$ indicates the load indicator and their associated weights respectively.

Following load calculations, the redirecting module 212 in the session broker 108 can redirect the new connection requests to a server computer with capacity or is handling fewer sessions than allowed. Though the redirecting module 212 has been discussed as being hosted on the session broker 108, it will be understood that the redirecting module 212 can be hosted on a different computing device, on one or more of the servers in the server collection 102, etc.

The Algorithm or Equation (1) may be used as a multi-pass algorithm. For example, at "pass 0" may relate to a preferred server if specified; at "pass 1" a least loaded server may be found which satisfies "Must Have" and "Nice to Have" conditions; a "pass 2", a least loaded server is found which satisfies only the "Must Have" condition. Therefore, if a user has a session with a different initial application on a particular server in the server farm, a "preferred server ID" can be initialized with an ID of that particular server. If that server ID is valid (which can be stored in a data base), and that server is not in a "drain" mode and a max session limit is not exceeded, then the server will be accepted as a final result, and the rest of load balancing logic is bypassed. A "Must Have" conditions can include that the Server ID is valid (a check may be made to determine if an extensibility plug-in was called and override the "preferred server ID"); that the server is not in "drain" mode, since "drain" mode may not allow creating of new non administrative sessions; the number of sessions, including pending redirections, is not exceeding a maximum session limit (if such a limit is set). A "Nice to Have" condition or "soft conditions" can include that the number of pending does not exceed a limit, where the limit may be registry configurable.

Exemplary Method(s)

Exemplary methods for managing and controlling connections to server computer devices are described with reference to FIGS. 1 and 2. These methods may be described in the general context of computer executable instructions. Generally, computer executable instructions can include routines, programs, objects, components, data structures, procedures, modules, functions, and the like, that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 3:
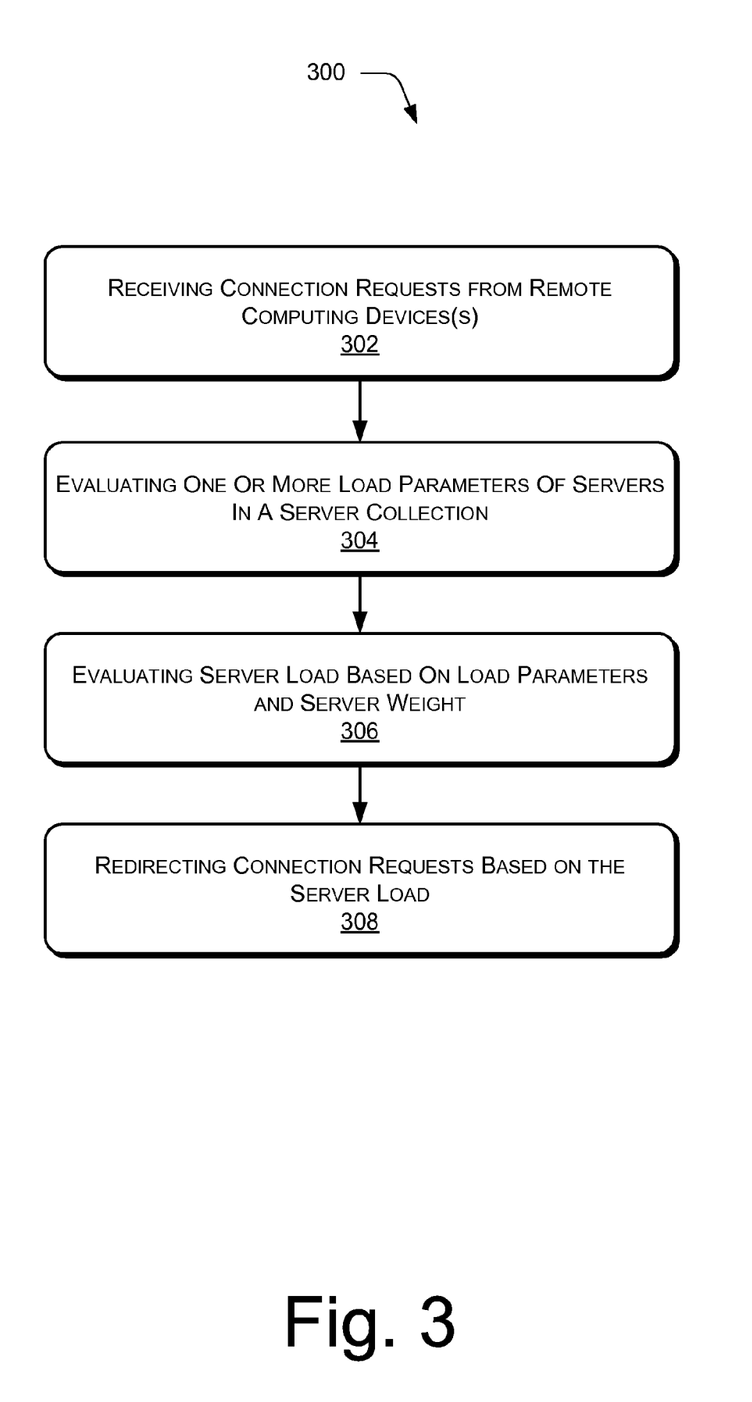
FIG. 3 is a flowchart illustrating an exemplary process for load balancing connection requests to a server computer in a server collection.

FIG. 3 illustrates an exemplary method 300 for load balancing connection requests to a server computer within a server collection, such as the server collection 102. The method 300 is illustrated as a collection of blocks in a logical flow diagram, which represents a sequence of operations that can be implemented in hardware, software, or a combination thereof. In the context of software, the blocks represent computer instructions that, when executed by one or more processors, perform the recited operations. The order in which the method is described is not intended to be construed as a limitation, and any number of the described blocks can be combined in any order to implement the process, or an alternate process. Additionally, individual blocks may be deleted from the method without departing from the spirit and scope of the subject matter described herein.

At block 302, connection requests are received from one or more users by a server computer within a server collection. Users may wish to access applications that may be hosted on the server computer. For example, the server computer 102-1 can receive connection requests from users through one or more of the clients 106. The connection requests can be made over a local network, such as LAN, or via remote networks such as the Internet. The users accessing the server computer 102-1 can be validated based on their user credential information. In one implementation, the session module 214 authenticates a user, for example, the user of the client 106-1, by validating the user's credentials.

At block 304, evaluation is performed for one or more load parameters associated with the server computers within the server collection. For example, the load balancing module 110 evaluates the load parameters associated with the server computer 102-1. Examples of such parameters may include, but are not limited to, server weight, the number of pending sessions, the number of active sessions, system-based resources like CPU resources, memory resources, and so on. In one implementation, the load parameters can be specified by an individual such as a system administrator.

At block 306, evaluation is performed to calculate the server load associated with each of the server computers in the server collection. For example, the load balancing module 110 evaluates the load associated with the server computer 102-1 based on the above-mentioned load parameters. For this purpose, recently updated values of the load parameters can be passed on to the load balancing module 110 through an interface, such as an RPC interface. In one implementation, the load associated with a server computer, such as the server computer 102-1, can be evaluated based on Equation (1) as described above.

At block 308, connection requests are redirected to the least loaded server computer. For example, the redirecting module 212 redirects the connection requests to a server computer, such as server computer 102-2, which might be associated with the lowest load value.

Figure 4:
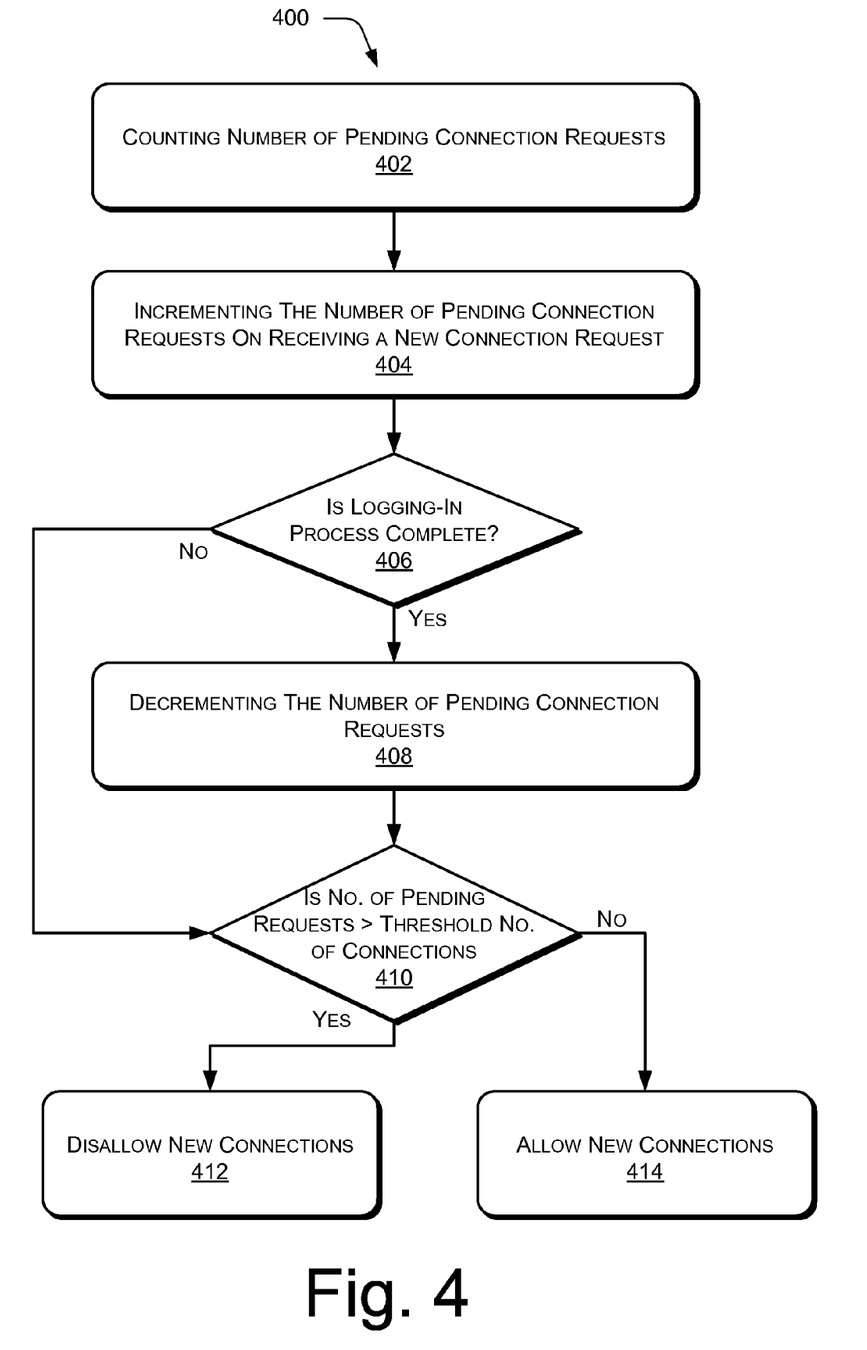
FIG. 4 is a block diagram illustrating an exemplary process for load balancing connection requests to a server computer in a server collection based on managing pending connection requests.

FIG. 4 illustrates an exemplary method 400 for managing pending sessions to implement load balancing for a server computer within a server collection. The method 400 is illustrated as a collection of blocks in a logical flow diagram, which represents a sequence of operations that can be implemented in hardware, software, or a combination thereof. In the context of software, the blocks represent computer instructions that, when executed by one or more processors, perform the recited operations. The order in which the method is described is not intended to be construed as a limitation, and any number of the described blocks can be combined in any order to implement the process, or an alternate process. Additionally, individual blocks may be deleted from the method without departing from the spirit and scope of the subject matter described herein.

At block 402, the number of pending connection requests are counted. For example, in distributed computing environments, such as systems based on Terminal Service™ system, a time lag persists between the assignment of a user, such as one of the clients 106 to the server computer 102-1, and completion of the logging-in process (e.g., authentication of the user credentials). Requests for connection, therefore, remain pending until the logging-on process is complete. In one implementation, the load balancing module 110 counts the number of users that wish to access a given server computer, such as the server computer 102-1, through one or more of the clients 106. The load balancing module 110 counts the number of pending sessions without waiting for the clients 106 to finish the logging-in process.

At block 404, the number of pending requests is incremented by one for each new connection request. For example, the session module 214 increments the count of the number of pending requests for each of the connection request.

At block 406, a determination is made to ascertain whether the logging-in process, related to one or more of the pending connection request, is complete. For example, the session module 214 ascertains whether the logging-in process for a particular process is complete or not. If the logging-in process for some pending connections is complete (i.e., following the 'YES' path from block 406), the process proceeds to block 408. If the logging-in process is not complete (i.e., following the 'NO' path from block 406), the process proceeds to block 410.

At block 408, the number of pending requests is decremented by one for authentication of every new connection request. For example, the number of pending connection requests is decremented by a count that is equivalent to the number of users that have completed the logging-in process. The process then proceeds to block 410.

At block 410, the number of pending requests is compared with a threshold value. For example, the load balancing module 110 compares the number of the pending requests with the threshold value for a server computer, such as the server computer 102-1. If the number of pending requests is greater than the threshold value for the server computer 102-1, the process proceeds to block 412 or else to block 414.

At block 412, new connections are disallowed. For example, when the number of pending requests is greater than the threshold value, the load balancing module 110 disallows further connections to be established to the server computer 102-1, following the 'YES' path from block 410.

At block 414, new connections are allowed. For example, when the number of pending requests is lesser than the threshold value, the load balancing module 110 allows further connections to be established to a server computer such as server computer 102-1, following the 'NO' path from block 410.

An Exemplary Computing Environment

Figure 5:
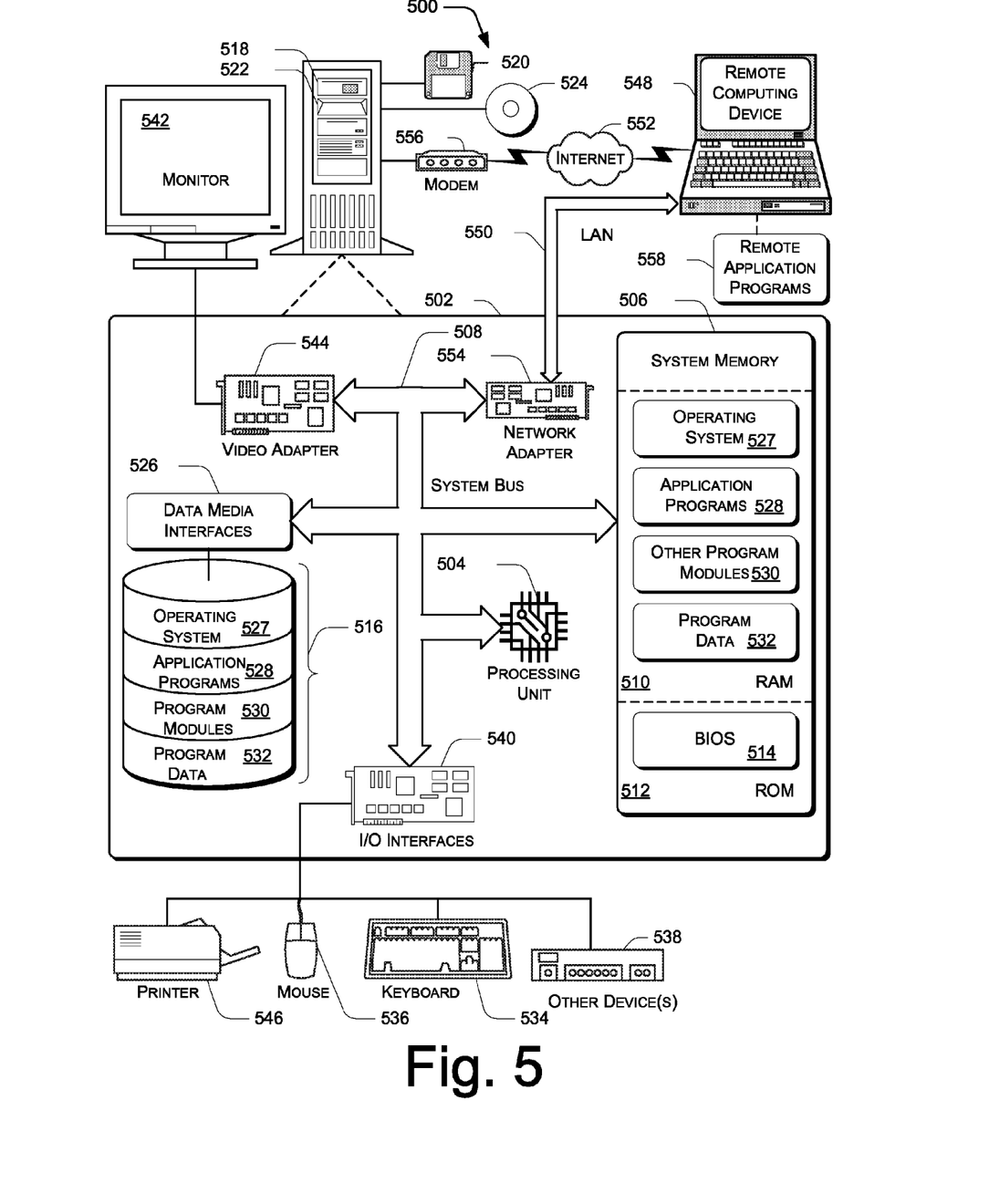
FIG. 5 is a block diagram illustrating an exemplary general computing environment.

FIG. 5 illustrates an exemplary general computing environment 500, which can be used to implement the techniques described herein, and which may be representative, in whole or in part, of elements described herein. The computing environment 500 is only one example of a computing environment and is not intended to suggest any limitation as to the scope of use or functionality of the computer and network architectures. Neither should the computing environment 500 be interpreted as having any dependency or requirement relating to any one or combination of components illustrated in the exemplary computing environment 500.

The computing environment 500 includes a general-purpose computing-based device in the form of a computer 502. Computer 502 can be, for example, a desktop computer, a handheld computer, a notebook or laptop computer, a server computer, a game console, and so on. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512 is illustrated. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown). furthermore FIG. 5 illustrates a magnetic disk drive 518 for reading from and writing to a removable, non-volatile magnetic disk 520 (e.g., a "floppy disk"), additionally FIG. 5 illustrates an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternately, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 527, one or more application programs 528, other program modules 530, and program data 532. Each of such operating system 527, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546, which can be connected to computer 502 via the input/output interfaces 540.

Computer 502 can operate in a networked environment using logical connections to one or more remote computers, such as a remote computing-based device 548. By way of example, the remote computing-based device 548 can be a personal computer, portable computer, a server computer, a router, a network computer, a peer device or other common network node, and the like. The remote computing-based device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing-based device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media".

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for load balancing of connection requests to a server computer within a server collection have been described in language specific to structural features and/or methods, it is to be understood that the subject of the appended claims is not necessarily limited to the specific features or methods described. Rather, the specific features and methods are disclosed as exemplary implementations for load balancing connection requests to a server computer within a server collection.

What is claimed is:

1. A server broker server connected to one or more servers in a server collection, comprising:
   one or more processors; and
   at least one memory coupled to the one or more processors, the at least one memory storing computer-program instructions of one or more modules executable by the one or more processors; wherein:

the one or more servers in the server collection are associated with a number of pending sessions, a number of active sessions and a number of disconnected sessions;

the one or more modules include a load balancing module in the at least one memory that calculates a load of each of the one or more servers based at least in part on the number of pending sessions associated with the respective server of the one or more servers and redirects connection requests to the one or more servers in the server collection based at least in part on the calculated loads of the one or more servers;

the load balancing module further determines a number of pending reconnect requests from disconnected sessions associated with at least one server of the one or more servers, compares the determined number of pending reconnect requests with a threshold value, and if the determined number of pending reconnect requests is greater than the threshold value, redirects one or more disconnected sessions making reconnect requests from the at least one server of the one or more servers to another of the one or more servers.

2. The server broker server of claim 1, wherein the server broker server and the one or more servers communicate through a Remote Procedure Call interface.

3. The server broker server of claim 1, wherein the one or more servers include a user interface to enable the one or more servers to participate in session broker load balancing.

4. The server broker server of claim 1, wherein the load of the one or more servers is calculated based on one or more of the following parameters: pending sessions, a server weight associated with each of the one or more servers, and a number of active sessions.

5. The server broker server of claim 1, wherein the server broker server redirects connection requests to a least loaded server of the server collection.

6. The server broker server of claim 1, wherein the load balancing module determines the loads associated with the one or more servers of the server collection based on an index.

7. The server broker server of claim 1, wherein the load balancing module manages connection requests by monitoring a number of pending sessions associated with the server collection.

8. The server broker server of claim 1, wherein the load balancing module implements load balancing by managing a number of active sessions and a number of disconnected sessions that persist with the one or more servers in the server collection.

9. The server broker server of claim 1 further comprising a redirecting module in the memory, that redirects connection request from client computers to the one or more servers that are least loaded or handling fewer requests.

10. The server broker server of claim 1 further comprising a session module that authenticates users accessing the server collection based on the users' credentials.

11. A method of load balancing connection requests to a server computer in a server collection comprising:
receiving connection requests from one or more users;
evaluating load parameters associated with the server computer, and other server computers in the server collection;
calculating a server load associated with each of the server computers in the server collection, the calculating of the server load associated with each of the server computers based at least in part on:
a number of disconnected sessions associated with the respective server computer and an associated weighting for disconnected sessions,
a number pending sessions associated with the respective server computer and an associated weighting for pending sessions, and
a server weight associated with the respective server computer;
redirecting connection requests to a least loaded server computer;
determining a number of pending reconnect requests from disconnected sessions associated with at least one server of the one or more servers;
comparing the determined number of pending reconnect requests with a threshold value, and
if the determined number of pending reconnect requests is greater than the threshold value, redirecting one or more disconnected sessions making reconnect requests from the at least one server of the one or more servers to another of the one or more servers.

12. The method of claim 11, wherein the receiving includes validating credentials of the one or more users.

13. The method of claim 11, wherein the evaluating load parameters includes one or more the following parameters: server weight, number of pending sessions, number of active sessions, and system-based resources.

14. The method of claim 11, wherein, for each server computer, the calculating of the server load is based at least in part by:
determining a sum of:
a multiplication of a number of active sessions associated with the respective server computer and an associated weighting for active sessions;
a multiplication of the number of disconnected sessions associated with the respective server computer and the associated weighting for disconnected sessions; and
a multiplication of the number pending sessions associated with the respective server computer and the associated weighting for pending sessions; and
dividing the sum by the server weight associated with the respective server computer.

15. The method of claim 14, wherein the redirecting connection requests to the least loaded server computer is based on the server computer with a lowest server load value.

16. The method of claim 14, wherein the calculating of the server load is used for multi pass directed to a particular server.

17. A server broker server connected to one or more servers in a server collection, comprising:
one or more processors; and
at least one memory coupled to the one or more processors, the at least one memory storing computer-program instructions of one or more modules executable by the one or more processors; wherein:
the one or more servers in the server collection are associated with a number of pending sessions, a number of active sessions and a number of disconnected sessions;
the one or more modules include a load balancing module in the at least one memory that calculates a load of each of the one or more servers based at least in part on the number of active sessions associated with, and the number of disconnected sessions that persist with, the respective server of one or more servers in the server collection and redirects connection requests to the one or more servers in the server collection based at least in part on the calculated loads of the one or more servers; and the load balancing module determines a number of pending reconnect requests from disconnected sessions associated with at least one server of the one or more servers, and if the determined number of pending reconnect requests is greater than the threshold value, redirects one or more disconnected sessions making reconnect requests from the at least one server of the one or more servers to another of the one or more servers.

18. The server broker server of claim 17, wherein the load balancing module calculates the load of each of the one or more servers based at least in part on the number of pending sessions associated with the respective server of one or more servers.

* * * * *